July 15, 1952 E. BINEK 2,603,675

SYSTEM FOR SUPPRESSING ELECTROMAGNETIC INTERFERENCE

Filed Sept. 19, 1950

INVENTOR.
EDWARD BINEK
BY
Fidler, Connel & Beardsley
ATTORNEYS

Patented July 15, 1952 2,603,675

UNITED STATES PATENT OFFICE 2,603,675

SYSTEM FOR SUPPRESSING ELECTROMAGNETIC INTERFERENCE

Edward Binek, Detroit, Mich., assignor to Burroughs Adding Machine Company, Detroit, Mich., a corporation of Michigan Application September 19, 1950, Serial No. 185,677

10 Claims. (Cl. 172—36)

This invention relates to systems for suppressing electromagnetic interference and has to do more particularly with a system for suppressing electromagnetic interference with the operation of electronic equipment, particularly radio and television receivers, such as is caused by the operation of dynamo-electric machines of the commutating type.

The invention has particular utility in connection with small electric motors of the type used in household appliances such as sewing machines, vacuum cleaners, food mixers, floor polishers, and the like although, as will appear hereinafter, it is capable of other applications.

It is well known that electric motors of the commutating type generate transient currents or impulses which have steep wave fronts and are rich in harmonics capable of causing interference over a wide range of frequencies. Such transients or impulses are generated by reason of current interruptions occurring in commutation, sparking between the brushes and commutator bars, and irregular magnetic flux patterns. These disturbances reach adjacent electronic equipment by either radiation or conduction, thus producing undesirable responses in such equipment. A very common example of such interference is that which is produced in radio and television receivers by the motors of household appliances, which motors are generally either series wound direct current motors or universal motors.

Heretofore interference with radio reception has been suppressed by various means such as the use of small capacitors connected to the brushes of the motor or by the insertion of an inductance-capacitance filter in the supply line to the motor. While this type of suppression has been partially effective in suppressing interference with ordinary broadcast radio reception, it has proved inadequate for suppressing interference with television reception owing to the fact that the inductance of the capacitors and distributed capacity of the inductance is sufficient to cause resonance at frequencies employed in television practice.

An object of the present invention is the provision of a novel system for suppressing electromagnetic interference with the operation of electronic equipment.

Another object is the provision of a system for suppressing electromagnetic interference with electronic equipment over a wide range of frequencies including the very high frequencies employed in television practice.

Another object is the provision of a system especially well adapted for application to motor-driven household appliances for suppressing interference with the operation of radio and television receivers.

A further object is the provision of dynamo-electric equipment having incorporated therein novel means for suppressing electromagnetic interference with the operation of electronic equipment.

A still further object is the provision of a novel system for suppressing electromagnetic interference with adjacent electronic equipment, which system is simple, compact and inexpensive and is well adapted for application to dynamo-electric equipment, particularly small motors of the type widely employed in household appliances.

Other objects and advantages of the invention will appear from the following description taken in connection with the appended drawings, wherein.

Figure 2:
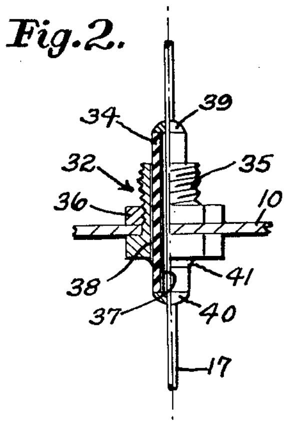
Fig. 2 is an enlarged fragmentary elevational view, partially in cross-section, of a detail of the structure shown in Figure 1.
Figure 1:
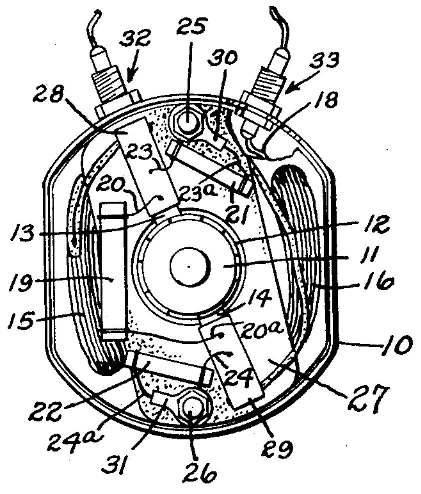
Figure 1 is a front elevational view of apparatus embodying the present invention a portion of the casing of which is removed to show interior details.
Figure 3:
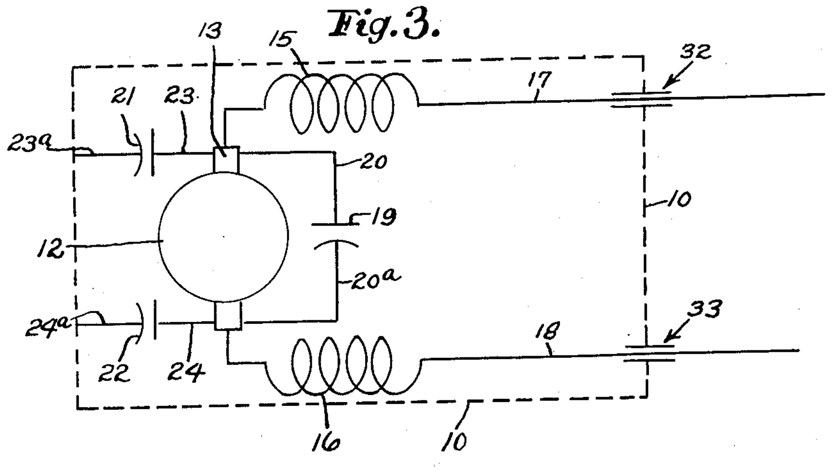
Fig. 3 is a diagrammatic representation of the system of the present invention as embodied in the structure illustrated in Figure 1.

The structure in accordance with the present invention comprises a metallic casing 10 which preferably is the casing of the motor to which the system is applied but which may be a separate casing enclosing and supporting the motor and other elements of the system, as hereinafter more fully described. The casing 10 which conveniently may be made in two sections (one of which is shown) is completely closed so as to completely enclose and surround the other portions of the system except as hereinafter described, and thereby to electromagnetically shield such elements. The motor is a commutating motor either of the universal or series wound direct current type, and for the purposes of illustration a motor of the former type is shown. Since the invention is applicable to various types of commutating motors and is not limited to any specific motor of such type, the motor is shown herein generally and in only sufficient detail for an understanding of the invention.

The motor comprises the usual elements found in a universal motor, and includes an armature 11 having a commutator 12 with which brushes 13 and 14 cooperate in the usual manner, field coils 15 and 16 connected in series with the armature, and conductors 17 and 18 which are connected to the field coils for the purpose of connecting the motor to a suitable source of power (not shown). The conductors 17 and 18 extend through the wall of the casing 10 in a manner described more in detail hereinafter.

For the purpose of suppressing arcing across the brushes and commutator, a capacitor 19 is connected directly between the brushes 13 and 14 by a short connection formed by conductors 20 and 20*a* which are as short and straight as practicable. This capacitor not only minimizes brush arc but also serves to reduce the steepness of the transients or impulses, thereby reducing the harmonic content of the current variation. In order to serve the purpose indicated I prefer to employ a capacitor having a capacitance of around 0.010 micro-farad.

The brushes 13 and 14 are connected respectively to the casing 10 through capacitors 21 and 22 by conductors 23, 23*a*, and 24, 24*a*, which preferably are as straight and short as practicable. These capacitors serve to by-pass to the casing electromagnetic disturbances over a frequency range determined by the resonant frequency of the capacitors. Excellent results in suppressing disturbances which interfere with high frequencies such as those employed in radio receiver practice have been obtained by employing capacitors each having a capacitance of around 0.005 micro-farad.

The motor elements are secured in the casing 10 and mounted by two shafts 25 and 26 which are grounded to the casing and which support an insulating plate 27 through which the commutator 12 extends. The plate 27 is secured in the casing 10 and carries holders 28 and 29 for the brushes 13 and 14 respectively. The capacitor 19 is supported by its own connections 20 and 20*a* which are soldered respectively to the brush holders 28 and 29. The capacitors 21 and 22 are supported by their respective connections 23, 23*a*, and 24, 24*a*, which are soldered to the brush holders 28 and 29 and to terminal clips 30 and 31 carried by and conductively connected to the shafts 25 and 26.

I have found that the arrangement thus far described adequately suppresses interference resulting from disturbances at relatively low, medium and high frequencies. However, it is desirable to suppress interference with the operation of television receivers and other electronic equipment operated at very high frequencies and to this end I provide an additional arrangement for suppressing such interference. In this connection it has been determined that such very high frequency disturbances may be propagated along the power connections to the motor such as the conductors 17 and 18 shown in the drawings. To the end of eliminating or suppressing such interference I provide a capacitive connection between the conductors 17 and 18 respectively and the casing 10 at the points where the conductors pass out of the casing. The capacitive connection has very low inductance and high resonant frequency and serves to by-pass to the casing disturbances at very high frequencies such as television or higher frequencies. This connection also serves to isolate from each other the portions of the conductors 17 and 18 within the casing or what may be termed the "input" leads and the portions externally of the casing or what may be termed the "output" leads of the filter constituted by the capacitors and the connections above described.

The capacitive connections between the conductors 17 and 18 respectively and the casing are provided by feed-through capacitors 32 and 33 one of which is illustrated somewhat in detail in Fig. 2, to which reference now is made. The capacitor 17 comprises a hollow cylindrical member 34 of a high dielectric constant and preferably it is formed of ceramic material which not only provides the desired insulation but also adequate mechanical strength. The cylindrical member 34 is suitably secured in the wall of the casing 10 as by a headed bushing-like member 35 threadedly receiving a lock-nut 36 which cooperates therewith to clamp the member 35 to the wall of the casing. The cylindrical member 34 is provided with inner and outer conductive surfaces 37 and 38 respectively which preferably are constituted by silver plating at least portions of the inner and outer surfaces of such member. The conductive surfaces 37 and 38 are thus insulatingly separated from each other and together with the cylindrical member 34 form a capacitor. The corresponding conductor (for example, the conductor 17) is electrically connected to the inner conducting surface 37 as by soldering 39 and 40 at the two ends of the cylindrical member 34, such soldering serving also as a seal around the conductor. The outer conductive surface 38 is conductively connected to the casing by reason of its intimate contact with the member 34 and may be additionally connected by soldering 41 which also serves to secure the member 34 in the member 35.

The feed-through capacitor or condenser bushing (such as the capacitor 32) provides a very short, low inductance connection between the corresponding conductor and the motor casing and is so constructed that it has a low capacitance and therefore a high resonant frequency. Accordingly it serves to prevent the propagation beyond the casing of disturbances having high frequencies of the order of frequencies employed in television equipment, or higher frequencies. I have found that excellent interference suppression of this character may be obtained by employing feed-through capacitors or condenser bushings each having a capacitance of not more than 0.0015 micro-farads.

The system constructed in accordance with the principles of the present invention as hereinabove illustratively described has been found to be very successful in suppressing electromagnetic interference with electronic equipment generated by dynamo-electric equipment of the commutating type and particularly series wound direct current or universal motors. The system is particularly well suited for application to fractional horsepower motors of the type commonly employed in household appliances. The several capacitors and conductors employed are small and compact and they therefore can be installed in the existing space within the motor housing in a large number of types of motors of already existing designs. Accordingly it is not necessary to provide an enlarged casing or to re-design such motors to receive such capacitors. The elements which are employed in connection with the motor and casing are relatively inexpensive to manufacture and assemble with the motor and therefore the application of the present invention to motors of the type mentioned herein does not add materially to the cost of the motor.

I claim:

1. The combination with an electric motor having a commutator, brushes cooperating with said commutator, and current conductors connected to said brushes respectively, of a closed casing of conductive material enclosing said motor and having outlet openings through which said conductors extend respectively, a capacitive connection between said brushes, a capacitive connection between each brush and said casing, and a capacitive connection between each said conductor and said casing at the corresponding outlet opening, said last named capacitive connection having such low inductance as to resonate at a frequency at least as high as the frequency of the electromagnetic disturbances to be suppressed.

2. The combination with an electric motor having a commutator, brushes cooperating with said commutator, and current conductors connected to said brushes respectively, of a closed casing of conductive material enclosing said motor and having outlet openings through which said conductors extend respectively, a capacitive connection between said brushes, a capacitive connection between each brush and said casing of lower capacitance than said connection between said brushes, and a capacitive connection between each said conductor and said casing at the corresponding outlet opening of lower capacitance than either of said other capacitive connections.

3. The combination with an electric motor having a commutator, brushes cooperating with said commutator, and current conductors connected to said brushes respectively, of a closed casing of conductive material enclosing said motor and having outlet openings through which said conductors extend respectively, a capacitor having a capacitance of approximately 0.005 micro-farads connected between said brushes, a capacitor having a capacitance of approximately 0.010 micro-farads connected between each brush and said casing, and a capacitor having a capacitance of approximately 0.0015 micro-farads connected between each said conductor and said casing at the corresponding outlet opening.

4. The combination with an electric motor having a commutator, brushes cooperating with said commutator, and current conductors connected to said brushes respectively, of a closed casing of conductive material enclosing said motor and having outlet openings through which said conductors extend respectively, a low inductance capacitive connection resonating at a frequency at least as high as the frequency of the electromagnetic disturbance to be suppressed between said brushes, a capacitive connection between each brush and said casing, and a low inductance capacitive connection resonating at a frequency at least as high as the lowest frequency of the electromagnetic disturbance to be suppressed between each said conductor and said casing at the corresponding outlet opening.

5. The combination with an electric motor having a commutator, brushes cooperating with said commutator and current conductors connected to said brushes respectively, of a closed metallic casing enclosing said motor, and having outlet openings through which said conductors extend, respectively, a high frequency by-pass across said brushes, a high frequency by-pass between said brushes and said casing, and a high frequency by-pass between each of said conductors and said casing, each of said high frequency by-passes being so constructed and arranged as to resonate at a frequency at least as high as the lowest frequency of the interference to be suppressed.

6. The combination with an electric motor having a commutator, brushes cooperating with said commutator and current conductors connected to said brushes respectively, of a closed metallic casing enclosing said motor, and having outlet openings through which said conductors extend, respectively, a condenser connected across said brushes, a condenser connected between said brushes and said casing, and a condenser bushing in each said outlet opening and receiving therethrough the corresponding conductor, each of said bushings including an inner conductive element engirdling and connected to the corresponding conductor and an outer conductive element engirdling said inner conductive element and connected to said casing, and a dielectric element between and insulatingly separating said conductive elements.

7. The combination with an electric motor having a commutator, brushes cooperating with said commutator and current conductors connected to said brushes respectively, of a closed metallic casing enclosing said motor, and having outlet openings through which said conductors extend, respectively, a condenser connected across said brushes, a condenser connected between each said brush and said casing, and a condenser bushing in each said outlet opening and receiving therethrough the corresponding conductor, each of said brushings including a cylindrical member of dielectric material extending through a wall of said casing and receiving and supporting the corresponding conductor, and having an inner conductive surface connected to said conductor and an outer conductive surface separated from said inner surface, and means securing said cylindrical member on said casing and connecting said outer surface and said casing.

8. The combination with an electric motor having a casing, a commutator, brushes cooperating with said commutator, brush holders carrying said brushes and current conductors connected to said brushes and extending from said casing of mounting means mounting said motor in said casing and conductively connected to said casing, an insulating means in said casing carried by said mounting means and carrying said brush holders, a capacitor conductively connected to and supported by said brush holders, a pair of capacitors each conductively connected to one of said brush holders and to one of said supporting members and supported thereby, and condenser bushings mounted in and extending through said casing surrounding and supporting the portions of said current conductors which extend through said casing.

9. The combination with an electric motor having a casing, a commutator, brushes cooperating with said commutator, brush holders carrying said brushes and current conductors connected to said brushes and extending from said casing of a pair of mounting members mounting said motor in said casing and conductively connected to said casing, an insulating member in said casing carried by said mounting members and carrying said brush holders, a capacitor having external conductors secured to said brush holders and supporting said capacitor, a pair of capacitors each having external conductors secured and conductively connected to one of said brush holders and to one of said supporting members respectively and supporting said capacitor, and condenser bushings mounted in and extending through said casing surrounding and supporting the portions of said current conductors which extend through said casing.

10. The combination with an electric motor having a casing, a commutator, brushes cooperating with said commutator, brush holders carrying said brushes and current conductors connected to said brushes and extending from said casing of a pair of mounting members mounting said motor in said casing and conductively connected to said casing, an insulating plate in said casing carried by said mounting members at one end of said casing and carrying said brush holders, a capacitor having external conductors secured to said brush holders and supporting said condenser, a pair of capacitors each having external conductors secured and conductively connected to one of said brush holders and to one of said supporting members respectively and supporting said capacitors, and condenser bushings mounted in and extending through said casing on the other end of said casing surrounding and supporting the portions of said current conductors which extend through said casing.

EDWARD BINEK.

REFERENCES CITED

The following references are of record in the file of this patent:

UNITED STATES PATENTS

| Number | Name | Date |
|---|---|---|
| 1,940,472 | Van Der Pol | Dec. 19, 1933 |

FOREIGN PATENTS

| Number | Country | Date |
|---|---|---|
| 635,893 | France | Jan. 3, 1928 |